Feb. 2, 1932.    M. W. McCONKEY    1,843,609
WHEEL
Filed Sept. 8, 1925
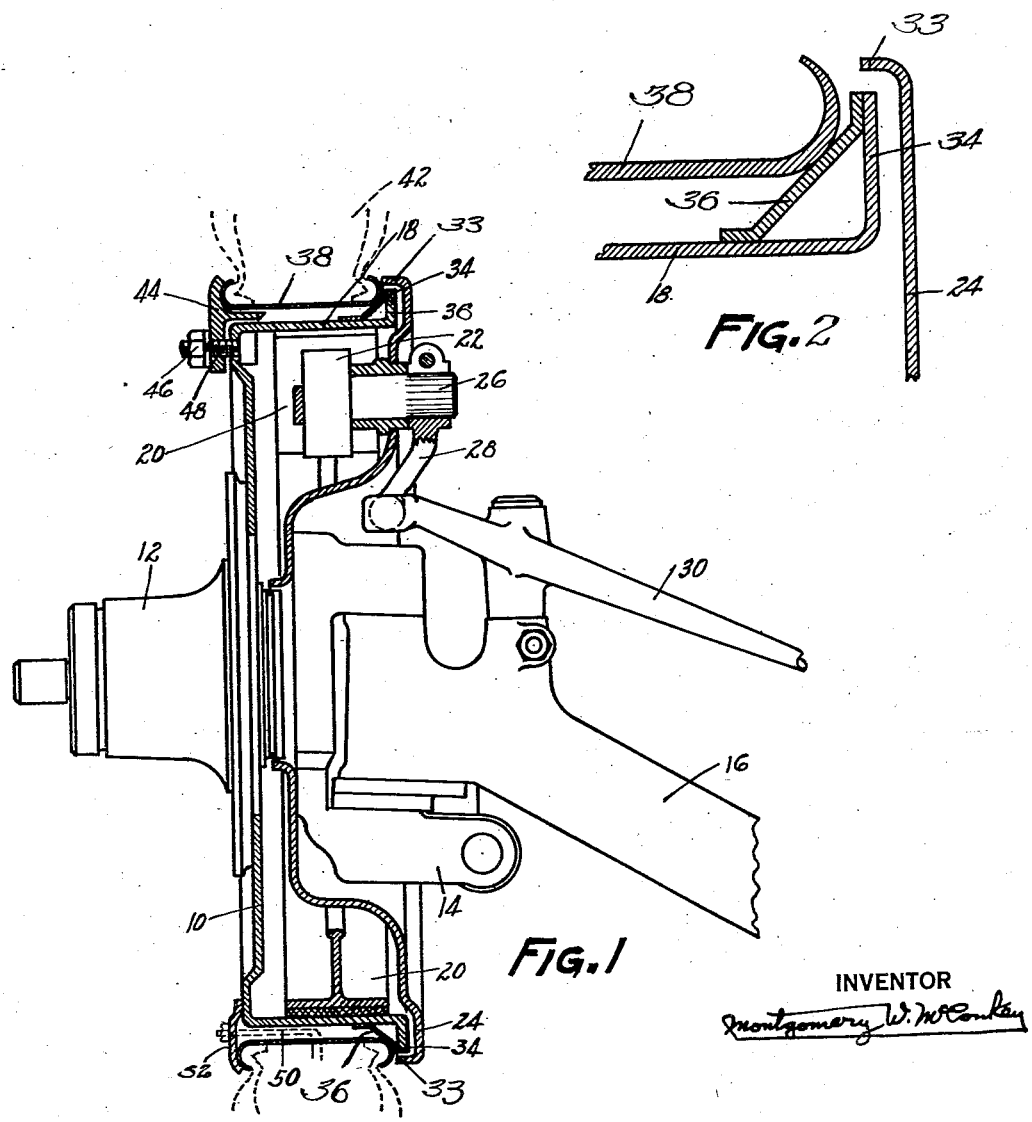
INVENTOR
Montgomery W. McConkey Patented Feb. 2, 1932

1,843,609

UNITED STATES PATENT OFFICE

MONTGOMERY W. McCONKEY, OF CHICAGO, ILLINOIS, ASSIGNOR, BY MESNE ASSIGNMENTS, TO BENDIX BRAKE COMPANY, OF CHICAGO, ILLINOIS, A CORPORATION OF ILLINOIS

WHEEL

Application filed September 8, 1925. Serial No. 55,057.

This invention relates to wheels having brakes, and is illustrated as embodied in a front automobile wheel having an internal expanding brake.

With the present extensive use of balloon tires, it is becoming increasingly difficult to provide a wheel, which may be only twenty inches in diameter, with a brake drum of adequate size, this often being seventeen or more inches in diameter. An object of the present invention is to avoid these difficulties by using the brake drum itself as a disk wheel, preferably by wedging a demountable rim axially onto the braking flange of the drum.

An important feature of the invention relates to providing a yieldable mounting for a demountable rim structure, said mounting being incorporated in the braking flange of the aforementioned brake drum structure. In one desirable arrangement, the valve projects outwardly between the rim and the braking flange of the drum.

These and other objects and features of the invention, including various novel combinations of parts and desirable particular constructions, will be apparent from the following description of the illustrative embodiments shown in the accompanying drawings, in which:

Fig. 1 is a vertical section through one form of wheel and rim structure constituting the invention; and Figure 2 is an enlarged partial vertical section through the rim mounting structure of Figure 1.

In the arrangement of Figs. 1 and 2, the wheel consists of a brake drum 10, rotating with a hub 12 mounted on the spindle of a knuckle 14 swivelled, by a kingpin or the like, at the end of the front axle 16.

The drum 10 has at its outer edge a generally cylindrical braking flange 18, engaged by the friction means of the brake, illustrated as shoes 20 expanded by a double cam 22 and enclosed between drum 10 and a backing plate 24 carried by the knuckle 14. Cam 22 has a shaft 26 with a crank arm 28 terminating in a ball engaged by a vertical plane surface of a generally horizontal lever 30 fulcrumed on axle 16. The joint between lever 30 and crank arm 28, when the brake is applied, is substantially in the swivelling axis of the wheel.

The inner edge of the braking flange 18 is flared radially outwardly and is encircled by a cylindrical flange 33 on the backing plate 24. The angular portion of the wheel braking member included between the base of the flange 18 and a radially extending edge flange 34 extending therefrom may be provided with a filler member, preferably comprising a plurality of separate stamping members 36 together constituting the filler. The stampings are preferably angular in cross section, as disclosed. Each of said stampings may be secured at but one of its edges to either the base 18 or flange 34, preferably the latter, to thereby provide a yieldable support member for a demountable rim 38. The free edge of each of the stampings provides a relatively sliding engagement of the filler and flange.

The wheel is completed by the rim 38 carrying a tire 42, and wedged axially onto the support parts 36. In the particular arrangement shown, the rim has a set of clamps 44 welded or otherwise secured permanently to its outer edge, and engaged by clamping nuts 46 on bolts 48 having their heads received in recesses punched in the drum, or in an annular recess as appears in Fig. 1.

Tire 42 preferably has a right-angle valve stem 50, or equivalent inflating means, projecting outwardly between rim 40 and flange 18. The drum is punched out on opposite sides of one of the bolts, to form shoulders engaging opposite sides of one of the clamps 44, to drive the rim.

While two illustrative embodiments have been described in detail, it is not my intention to limit the scope of the invention to those particular embodiments, or otherwise than by the terms of the appended claims.

I claim:

1. In a wheel structure, a rim supporting felly member provided with a radially extending flange member at one side edge thereof, together with a support member secured at one of its edges to one of said members and slidingly engaging the other of said members at its other edge to thereby provide a yieldable member adapted to support a demountable rim.

2. In a wheel structure, a rim supporting felly member provided, at one side edge thereof, with a radially extending flange member, an angular shaped support member secured at one of its edges to said flange member, said angular shaped support member slidably engaging the felly member at its other edge to thereby provide a yieldable member adapted to support a demountable rim.

3. In a wheel structure, a rim supporting felly member provided, at one side edge thereof, with a radially extending flange member, together with a plurality of channel shaped stampings, each bridging the angle included by the felly and flange members, each of said stampings being secured at one of its edges to one of said members and slidably engaging the other of said members at its other edge, to thereby provide yieldable members adapted to support a demountable rim.

In testimony whereof I have hereunto signed my name.

MONTGOMERY W. McCONKEY.